2,770,631

Patented Nov. 13, 1956

2,770,631

HYDROXYESTER SUBSTITUTED SILOXANES

Robert L. Merker, Pittsburgh, Pa., assignor to Dow Corning Corporation, Midland, Mich., a corporation of Michigan No Drawing. Application May 20, 1954,
Serial No. 431,297

11 Claims. (Cl. 260—448.2)

This invention relates to siloxanes having hydroxy ester groups attached to the silicon by silicon-carbon bonds.

It is the object of this invention to produce novel organosiloxane compositions which are useful as sun screening agents, as antioxidants, as lubricants and as additives for increasing the lubricity of polysiloxanes.

This invention relates to siloxanes of the unit formula $$[(HO)_x RCOOCH_2]R'_n SiO_{\frac{3-n}{2}}$$

in which R is a polyvalent hydrocarbon radical, R' is a monovalent hydrocarbon radical, $n$ has a value from 1 to 2 inclusive and $x$ has a value of at least 1. The siloxanes of this invention are best prepared by reacting a metal salt (preferably an alkali metal salt) of a hydroxy acid with a halomethylsiloxane of the formula $$(XCH_2)R'_n SiO_{\frac{3-n}{2}}$$

This reaction proceeds best when a mixture of the salt and the halomethylsiloxane is heated. If desired, a mutual solvent of the salt and the siloxane may be employed. Suitable solvents include nonreactive polar solvents such as dimethylformamide. During the reaction it is preferable to keep the reaction mixture acidic in order to prevent cleavage of the halomethyl groups of the siloxane. When the reaction is complete the metal chloride is removed by filtration or other suitable means and the desired product is obtained by removal of any solvent used in the reaction.

For the purpose of this invention any monocarboxylic hydroxy acid is suitable. It is immaterial whether one or more hydroxy groups are present in the acid. Thus for the purpose of this invention R can be any polyvalent hydrocarbon radical, i. e. it may be divalent, trivalent, tetravalent, or more, depending upon whether there are 1, 2, 3, or more hydroxy groups respectively attached thereto. Specific examples of acids which can be employed to prepare the compositions of this invention are aliphatic hydroxy acids such as glycolic acid, lactic acid, beta-hydroxybutyric acid, gamma-hydroxybutyric acid and 12-hydroxystearic acid and aromatic hydroxy acids such as salicylic acid, gallic acid, mendelic acid, protocatechuic acid, parahydroxycinnamic acid, 3,4-dihydroxycinnamic acid, 5-hydroxynaphthoic acid and 2,3-dihydroxy-p-toluic acid, and hydroxy alicyclic acids such as quinic acid. Thus it can be seen that the acids employed herein can be aliphatic, alicyclic or aromatic. They can be saturated or unsaturated in any portion of the molecule and they can have one or more hydroxy groups substituted on the molecule.

For the purpose of this invention the R' groups substituted on the silicon atom can be any monovalent hydrocarbon radical. Specific examples of such radicals are alkyl radicals such as methyl, ethyl, and octadecyl; alkenyl radicals such as vinyl, allyl, and hexenyl; alicyclic radicals such as cyclohexyl, cyclohexenyl and cyclopentyl; aromatic hydrocarbon radicals such as phenyl, naphthyl, xenyl and tolyl; and aralkyl hydrocarbon radicals such as benzyl. For the purpose of this invention the siloxanes may contain one or two monovalent hydrocarbon radicals attached to the silicon and the hydrocarbon radicals attached to the individual silicon atoms may be the same or different.

The halomethylsiloxanes which are employed as intermediates in this invention may be prepared by halogenating the corresponding methylsiloxanes or they may be prepared by halogenating the corresponding methylhalosilanes and thereafter hydrolyzing the siloxane. An alternative method is that of halogenating a methyltrihalosilane and thereafter reacting it with a Grignard reagent containing the desired monovalent hydrocarbon radical. In the latter case preferential reaction between the Grignard reagent and the silicon-bonded halogen will occur.

The hydroxyester substituted siloxanes of this invention may be copolymerized with hydrocarbon substituted siloxanes or with halogenated hydrocarbon substituted siloxanes of the formula $$R''_m SiO_{\frac{4-m}{2}}$$

where R'' is any monovalent hydrocarbon radical or any halogenated monovalent hydrocarbon radical and $m$ has an average value from 1 to 3 inclusive. The copolymerization may be carried out by means of the well known acid catalyzed siloxane copolymerization methods. Such copolymers may contain from .01 to 99.99 mol percent of the siloxanes of this invention, the remainder of the copolymer being the aforesaid hydrocarbon and halogenated hydrocarbon substituted siloxanes. These copolymers are useful as lubricants and sun screen agents.

The products of this invention are useful as sun screen agents in sun tan oils, paints, automobile waxes and polishes. They are particularly valuable because they are soluble in silicone fluids. Thus it is possible to employ them as antioxidants, EP additives and stabilizers for silicone fluids and greases. By means of the compounds of this invention it is possible to introduce many stabilizing agents into silicone fluids which could not heretofore be employed because the corresponding organic compounds are insoluble in such fluids.

The following examples are illustrative only and should not be construed as limiting the invention which is properly set forth in the appended claims.

Example 1

210 g. of sodium salicylate, 144 g. of bischloromethyltetramethyldisiloxane was placed in 200 g. of dimethylformamide and refluxed for two hours. The solvent and precipitated sodium chloride were removed by washing and the product was crystallized from ethanol at 0° C. to yield the crystalline compound

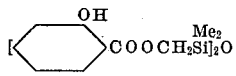

melting point 38° C.

Example 2

40.6 g. of octamethylcyclotetrasiloxane, 59.4 g. of the product of Example 1, and 2 g. of concentrated sulphuric acid were mixed and allowed to stand 6 hours at room temperature. The product was washed neutral and dried over anhydrous sodium sulphate. The product was a fluid which was a mixture of polymers having the formula

in which $n$ had an average value of 4. This experiment was repeated with varying the proportion of the reactants in order to give fluids in which n had average values ranging from 8 to 24. The properties of these fluids are summarized in the table below.

| n | Average molecular weight | $n_D^{25}$ | $d_4^{25}$ | MR Found | MR Theory |
|---|---|---|---|---|---|
| 4 | 730 | 1.4741 | 1.07 | 191.9 | 188.2 |
| 8 | 1,026 | 1.4543 | 1.05 | 265 | 262.7 |
| 12 | 1,322 | 1.4432 | 1.03 | 342 | 337.3 |
| 16 | 1,618 | 1.4356 | 1.02 | 414 | 411.8 |
| 20 | 1,914 | 1.4295 | 1.01 | 489 | 486.4 |
| 24 | 2,210 | 1.4265 | 1.005 | 562 | 561.0 |

These fluids were uniformly characterized by having longer gel times at 250° C. than the corresponding trimethyl end-blocked dimethylpolysiloxane fluids. They also showed much better absorption of ultraviolet light of the wave-length range 2800 to 3200 angstrom units, than dimethylpolysiloxane fluids. This shows that these materials would be effective sun screen agents in retarding damage to surfaces caused by ultraviolet light.

*Example 3*

155 g. of sodium glycolate, 147 g. of bis-chloromethyltetramethyldisiloxane were dissolved in a solution of 35 g. of 70 percent aqueous glycolic acid and 157 g. dimethylformamide. The mixture was refluxed for 6 hours. The solvent and sodium chloride were removed by washing and there was obtained a fluid having the formula

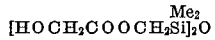
[HOCH₂COOCH₂Si(Me₂)]₂O

This fluid had the following properties, $n_D^{25}$ 1.4408, $d_4^{25}$ 1.103 and MR found 74.2, theory 74.1.

*Example 4*

91 g. of bis-chloromethyltetramethyldisiloxane, 106 g. of potassium lactate and 150 g. of dimethylformamide was refluxed for 2 hours. The precipitated potassium chloride was removed by filtration and an equal volume of benzene was added to the filtrate. The product was then washed with water to remove the dimethylformamide and the benzene layer was separated and the solvent evaporated to give 87.5 g. of a liquid having the formula

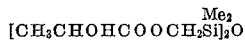
[CH₃CHOHCOOCH₂Si(Me₂)]₂O which had the following properties, $n_D^{25}$ 1.4448, $d_4^{25}$ 1.078, MR found 83.43, theory 83.34.

*Example 5*

50 g. of bis-chloromethylhexamethyldisiloxane, 147 g. of the sodium salt of 12-hydroxystearic acid, 33.5 g. of 12-hydroxystearic acid and 300 g. of dimethylformamide were refluxed for 6 hours. Sodium chloride was removed from the reaction product by filtration and there was obtained 25 g. as compared with the theoretical amount of 25.2 g. The dimethylformamide was removed from the filtrate by vacuum distillation. The resulting product was a compound of the formula

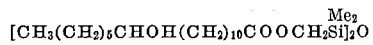
[CH₃(CH₂)₅CHOH(CH₂)₁₀COOCH₂Si(Me₂)]₂O which was contaminated with some 12-hydroxystearic acid.

*Example 6*

20 g. of chloromethylheptamethylcyclotetrasiloxane, 4.6 g. of glycolic acid, 5.9 g. of sodium glycolate and 17 g. of dimethylformamide were refluxed. The precipitated sodium chloride was removed by filtration and the theoretical amount 3.5 g. was obtained. Benzene was added to the filtrate and the resulting solution was washed with water to remove the dimethylformamide and glycolic acid. The benzene layer was separated and the solvent removed under vacuum. There was obtained 10.5 g. of a clear liquid product having the formula

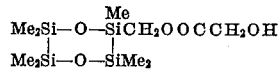

which had the following properties: $n_D^{25}$ 1.4253, $d_4^{25}$ 1.10.

*Example 7*

When 2 mols of the sodium salt of gallic acid are reacted with 1 mol of bis-chloromethyltetramethyldisiloxane in refluxing dimethylformamide, the compound

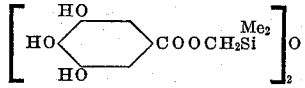

is obtained.

*Example 8*

When 1 mol of [ClCH₂(C₆H₅)₂Si]₂O is reacted with 2 mols of

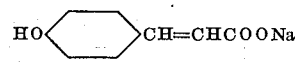

in refluxing dimethylformamide the compound

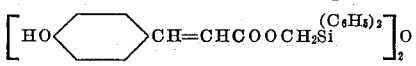

is obtained.

*Example 9*

When 1 mol of

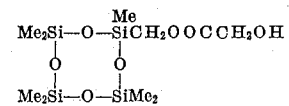

is copolymerized with 1 mol of chlorophenylmethylsiloxane and 1 mol of monovinylsiloxane by heating a mixture of the siloxanes in toluene solution with 1 g. of concentrated sulfuric acid, a copolymer composed of 33.3 mol percent chlorophenylmethylsilioxane, 33.3 mol percent monovinylsiloxane, 25 mol percent dimethylsiloxane and 8.4 mol percent

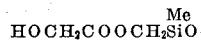

is obtained.

That which is claimed is:

1. A siloxane having the unit formula

$$[(OH)_xRCOOCH_2]R'_nSiO_{\frac{3-n}{2}}$$

in which R is a polyvalent hydrocarbon radical, R' is a monovalent hydrocarbon radical, n has a value of from 1 to 2 inclusive and x has a value of at least 1.

2. A siloxane in accordance with claim 1 wherein R' is a methyl radical.

3. A siloxane in accordance with claim 1 wherein R' is a phenyl radical.

4. 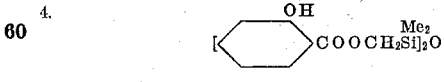

5. [HOCH₂COOCH₂Si(Me₂)]₂O

6. [CH₃CHOHCOOCH₂Si(Me₂)]₂O

7. [CH₃(CH₂)₅CHOH(CH₂)₁₀COOCH₂Si(Me₂)]₂O

8. A copolymeric siloxane in which from .01 to 99.99 mol per cent of the polymer units are of the formula

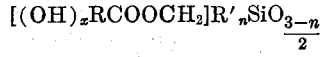
$$[(OH)_xRCOOCH_2]R'_nSiO_{\frac{3-n}{2}}$$

in which R is a polyvalent hydrocarbon radical, R' is a monovalent hydrocarbon radical, n has a value from 1 to 2 inclusive and $x$ has a value of at least 1, the remainder of the polymer units in said copolymer being of the formula $$R''_m SiO_{\frac{4-m}{2}}$$

where $R''$ is selected from the group consisting of monovalent hydrocarbon radicals and halogenated monovalent hydrocarbon radicals and $m$ has an average value from 1 to 3 inclusive.

9. A copolymeric siloxane in accordance with claim 8 in which both $R'$ and $R''$ are methyl radicals.

10. 

in which $n$ is an integer.

11. 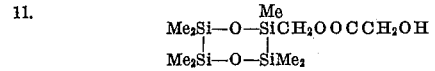

References Cited in the file of this patent

FOREIGN PATENTS 635,733      Great Britain _____ Apr. 12, 1950